W. W. BAKER & F. W. FRANKLIN.
METAL WORKING MACHINE.
APPLICATION FILED AUG. 26, 1916.
1,290,874.
Patented Jan. 14, 1919.
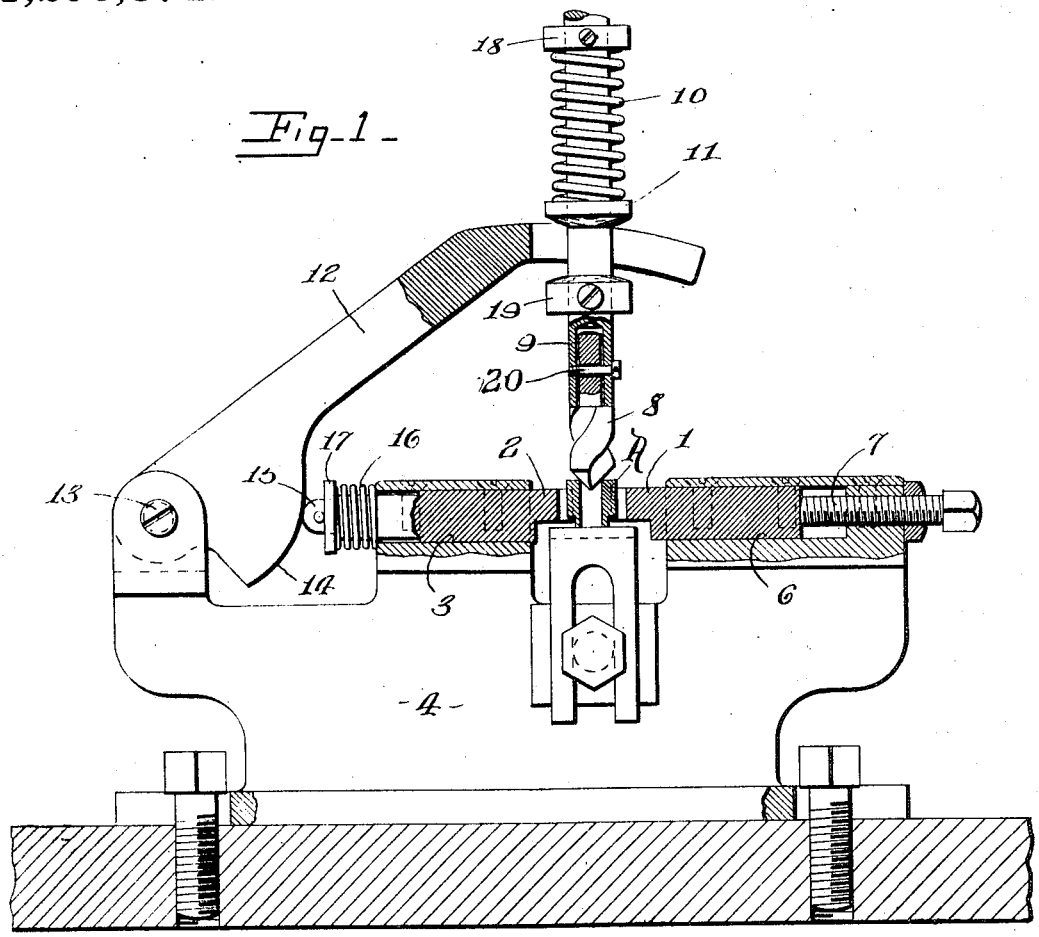
Fig-1-
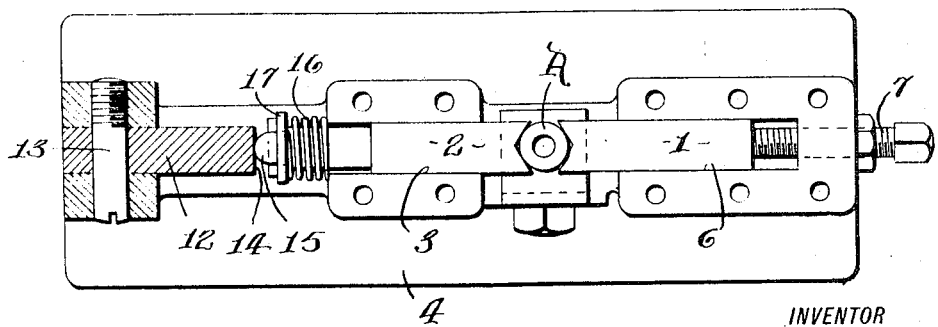
Fig-2-
INVENTOR
Walter W. Baker and
Frederick W. Franklin
BY
Parsons & Bodell
ATTORNEYS ly shown: on the page.# UNITED STATES PATENT OFFICE.

WALTER W. BAKER AND FREDERICK W. FRANKLIN, OF SYRACUSE, NEW YORK.

METAL-WORKING MACHINE.

1,290,874.

Specification of Letters Patent.  Patented Jan. 14, 1919.

Application filed August 26, 1916.  Serial No. 117,104.

*To all whom it may concern:*

Be it known that we, WALTER W. BAKER and FREDERICK W. FRANKLIN, citizens of the United States, and residents of Syracuse, in the county of Onondaga and State of New York, have invented a certain new and useful Attachment for Metal-Working Machines, of which the following is a specification.

This invention relates to metal working machines and has for its object a particularly simple and efficient attachment for automatically opening and closing the work holder during the feeding and retrograde movements of the tool. It also has for its object a particularly simple and efficient arrangement of the parts of the tool holder whereby the work is centered and whereby variations in the sizes of the work are automatically compensated for; and the invention consists in the combinations and constructions hereinafter set forth and claimed.

In describing this invention, reference is had to the accompanying drawings in which like characters designate corresponding parts in all the views.

Figure 1 is an elevation, partly in section, of this attachment for metal working machines, the contiguous part of a machine being also shown.

Fig. 2 is a plan view, partly in section, of parts seen in Fig. 1.

This attachment for metal working machines comprises a work holder having an opening and closing movement, and power transmitting connections between the reciprocating and rotating tool holder or spindle and the work holder to open and close the work holder during the reciprocating movement, the power transmitting connections including means arranged to yield when the work holder is clamped onto the work, and the tool holder continues its movement toward the work.

In this embodiment of my invention, the work holding means includes a fixed jaw 1, and a movable jaw 2, the latter being slidable in a suitable guide 3 provided on a base 4 of the attachment. The base may be secured in any suitable manner to the table 5 of the metal working machine.

The fixed jaw 1 is also arranged in a guide 6 and is held in its adjusted position by a set screw 7, the jaw 1 being adjusted to conform to the work A to be operated on.

The fixed jaw centers the work relatively to the tool 8 carried by the spindle 9, and the movable jaw automatically compensates for slight variations in the size of the work, for the reason to be hereinafter explained in connection with the actuating means for the jaw 2. The spindle is reciprocated and rotated in any suitable manner common to metal working machines.

The power transmitting connections between the spindle 9 and the jaw 2 includes a spring 10 mounted directly on the spindle 9 to yield after the jaw 2 is closed, and the spindle continues to move downwardly to feed the tool to the work.

The power transmitting connections include a spring pressed shoulder 11 mounted on the spindle 9 and a lever 12 against which the shoulder 11 is pressed by its spring, the lever being pivoted at 13 to the base 4 and having a cam 14 coacting with the end of a stem 15 on the movable jaw. A spring 16 is interposed between a shoulder 17 on the jaw 2, and the guide 3 for the jaw.

The spring 10 which acts on the shoulder 11 encircles the spindle 9 and is interposed between said shoulder 11 and the shoulder 18 fixed on the spindle 9.

An additional shoulder 19 is also fixed on the spindle 9 opposite to the shoulder 11, in order to move the lever 12 upwardly during retrograde movement of the spindle 9. The lever 12 is provided with a bifurcated end or fork which extends into the annular groove between the shoulders 11 and 19.

The tool 8 here illustrated is for removing the burs from the ends of the bores of articles and the tool 8 is preferably loosely held in the spindle in order that its conical end may automatically center the tool in the bore of the article. The tool 8 is here shown as having its shank loose in the socket of the spindle 9 and as held therein by a pin 20 extending transversely through the socket and the shank of the tool and loosely fitting a transverse hole in the shank.

In operation, when the spindle 9 is in its upper position, the work holder is open and the article or work A can be placed therein, either automatically or by hand. As the spindle descends the shoulder 11 carries the lever 12 downwardly, and thus closes the jaw 2 against the action of the compression spring 16 and as the jaw reaches its closed position, the spring 10 yields during continued downward movement of the spindle 9.

This attachment is particularly advantageous in that it is particularly simple in construction, is readily applied to a machine, and owing to the yielding means, all parts thereof are relieved of undue jars and strains, and the work holder automatically compensates for slight variations in the sizes of the articles being operated.

What we claim is:

1. In a metal working machine, the combination of a work holder having an opening and closing movement, a reciprocating tool holder, and power transmitting connections between the tool holder and the work holder to effect the opening and closing of the work holder including a spring yieldingly restraining the closing movement of the work holder, and a spring arranged to yield when the tool holder has reached its closed position to permit additional movement of the tool holder, substantially as and for the purpose described.

2. In a metal working machine, the combination of a reciprocating tool holder, a work holder having an opening and closing movement, in a direction at an angle to the reciprocating movement of the tool holder, and power transmitting connections between the tool holder and the work holder to effect the opening and closing of the work holder including a spring arranged to be tensioned by the movement of the tool holder and to yield when the tool holder engages the work and during the feeding thereof into the work, and a spring arranged to be pressed by the power transmitting means and to yieldingly press the work holder toward its closed position, substantially as and for the purpose specified.

3. In a metal working machine, the combination of a work holder having an opening and closing movement, a reciprocating tool holder including a spindle, having a shoulder slidable thereon, means for transmitting the reciprocating movement of the spindle to the work holder, for opening and closing the same comprising a power transmitting part coacting with the shoulder, and a spring pressing on the shoulder, substantially as and for the purpose specified.

4. In a metal working machine, the combination of a work holder having an opening and closing movement, a reciprocating tool holder including a spindle having a shoulder thereon, means for transmitting the reciprocating movement of the spindle to the work holder for opening and closing the same, comprising a shoulder slidable on the spindle and opposed to the former shoulder, a spring interposed between the shoulders, and a lever coacting with the slidable shoulder, substantially as and for the purpose set forth.

5. In a metal working machine, the combination of a work holder having an opening and closing movement, a reciprocating tool holder including a spindle having a shoulder thereon, means for transmitting the reciprocating movement of the spindle to the work holder for opening and closing the same comprising a shoulder slidable on the spindle and opposed to the former shoulder, a spring interposed between the shoulders, and a lever coacting with the slidable shoulder, and having a cam coacting with a portion of the work holding means to operate the same, substantially as and for the purpose described.

6. In a metal working machine, the combination of a work holder comprising a movable jaw, a reciprocating tool holder, and power transmitting connections between the tool holder and the movable jaw of the work holder comprising yielding means arranged to permit movement of the tool holder toward the work holder after the jaw has been moved into its closed position, substantially as and for the purpose specified.

7. In a metal working machine, the combination of a work holder comprising a movable jaw, a reciprocating tool holder movable toward and from the work holder, means for reciprocating the tool holder, and power transmitting connections between the tool holder and the movable jaw comprising a spring movable with the tool holder and a part arranged to be acted upon by the spring during the movement of the tool holder, the spring being arranged to yield when said part is held from movement by the movable jaw reaching its closed position, substantially as and for the purpose set forth.

8. In a metal working machine, the combination of a work holder comprising a movable jaw, a reciprocating tool holder having a shoulder thereon, power transmitting connections between the tool holder and the movable jaw of the work holder comprising a shoulder slidable on the tool holder and opposed to the former shoulder, a spring interposed between the shoulders, a lever arranged to be acted upon by the spring pressed slidable shoulder, a cam on said lever coacting with the movable jaw to move the same to its closed position, and a spring arranged to resist closing of the jaw, substantially as and for the purpose described.

In testimony whereof, we have hereunto signed our names at Syracuse, in the county of Onondago and State of New York, this 1st day of August, 1916.

WALTER W. BAKER.
FREDERICK W. FRANKLIN.